H. J. STEIGERWALD.
ANTISLIPPING PULLEY BELT.
APPLICATION FILED JAN. 27, 1914.
1,098,990.
Patented June 2, 1914.
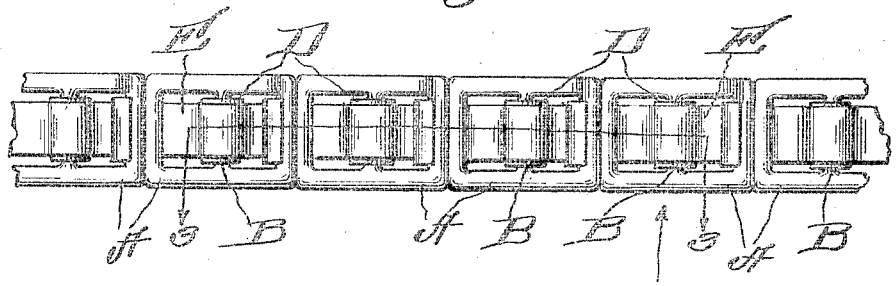
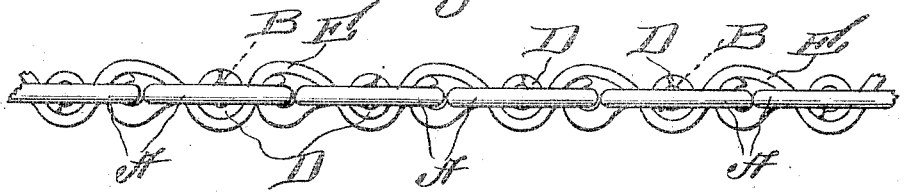
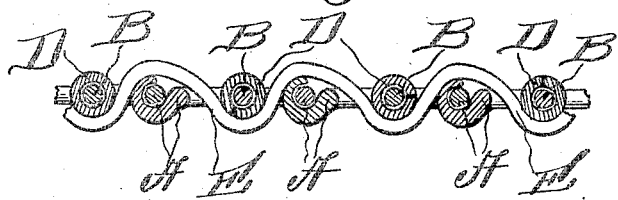
Witnesses
R. A. Boswell,
J. W. Sherwood
Inventor
H. J. Steigerwald,
By Franklin N. Hough
Attorney

UNITED STATES PATENT OFFICE.

HENRY J. STEIGERWALD, OF AUBURN, NEW YORK.

ANTISLIPPING PULLEY-BELT.

1,098,990.

Specification of Letters Patent.

Patented June 2, 1914.

Application filed January 27, 1914. Serial No. 814,820.

*To all whom it may concern:*

Be it known that I, HENRY J. STEIGERWALD, a citizen of the United States, residing at Auburn, in the county of Cayuga and State of New York, have invented certain new and useful Improvements in Antislipping Pulley-Belts; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in non-slipping belts for pulleys for various uses and consists essentially in the provision of a link chain in which a leather, canvas or other fabric strap is laced, thus affording means whereby the belt will be practically noiseless and so arranged that the leather or other strap will be relieved of any pulling strain.

The present invention is illustrated in the accompanying drawings, in which:—

Figure 1 is a side view of a section of a belt made in accordance with my invention. Fig. 2 is an edge view of the chain, and Fig. 3 is a sectional view on line 3—3 of Fig. 1.

Reference now being had to the details of the drawings by letter, A, A designate the links of a chain having pivotal connection in the usual manner and each link is provided with a cross bar B which is stationary and midway the length of the opening in the link. An open-ended tube D is placed over each cross bar, and E designates a strap made of leather, canvas or other material and which is of such a width as will pass through the openings in the links and which is threaded in and out over the various cross bars of the links, said strap also passing over said tubes, which latter serve further to hold the portions of the strap closer to the pulley wheel over which the belt is adapted to pass and to throw the bare part of the link farther from the pulley. There being a tube upon each cross bar, it will be noted that the belt may be reversed and used on either side, thus prolonging the usefulness of the same.

By the provision of a belt having the link chain work with a strap laced through the same in the manner shown, a noiseless belting is afforded and little pulling strain will come upon the fabric which is threaded loosely and which acts as a pad and an effectual means for preventing the belt slipping, which is an objection frequently met with in ordinary belts traveling upon pulleys of various kinds.

What I claim to be new is:—

1. An anti-slipping belt comprising a link chain having a cross bar in each link, a strap threaded through said links and over said cross bars, as set forth.

2. An anti-slipping belt comprising a link chain having a cross bar in each link, tubes upon said crosspieces, and a strap of suitable material threaded through the openings of said links and over said tubes, as set forth.

In testimony whereof I hereunto affix my signature in presence of two witnesses.

HENRY J. STEIGERWALD.

Witnesses:
JAMES DILLON,
ROBT. L. BURNETT.